United States Patent [19]

Vu

[11] Patent Number: 5,716,178
[45] Date of Patent: Feb. 10, 1998

[54] FLOATING GANG CHANNEL/NUT ASSEMBLY

[75] Inventor: Thai O. Vu, Santa Ana, Calif.

[73] Assignee: McDonnell Douglas Corporation, Huntington Beach, Calif.

[21] Appl. No.: 727,068

[22] Filed: Oct. 8, 1996

[51] Int. Cl.⁶ .................. F16B 27/00; F16B 37/00
[52] U.S. Cl. ...................... 411/85; 411/104; 411/966
[58] Field of Search .................... 411/84, 85, 104, 411/432, 966

[56] References Cited

U.S. PATENT DOCUMENTS

| | | |
|---|---|---|
| 2,384,729 | 9/1945 | Darby . |
| 2,421,278 | 5/1947 | Luce . |
| 2,429,833 | 10/1947 | Luce ........................ 411/84 |
| 2,455,145 | 11/1948 | Swanstrom . |
| 2,469,312 | 5/1949 | Poupitch . |
| 2,705,991 | 4/1955 | Reiner ........................ 411/84 |
| 2,879,820 | 3/1959 | Trzcinski . |
| 3,164,191 | 1/1965 | Grimm et al. ............... 411/966 X |
| 4,695,212 | 9/1987 | Berecz ....................... 411/85 |
| 4,768,907 | 9/1988 | Gauron ....................... 411/85 |
| 4,895,484 | 1/1990 | Wilcox ....................... 411/85 |
| 5,324,146 | 6/1994 | Parenti et al. ............... 411/82 |

*Primary Examiner*—Neill R. Wilson
*Attorney, Agent, or Firm*—The Bell Seltzer Intellectual Property Law Group of Alston & Bird LLP

[57] ABSTRACT

A gang channel nut assembly permits nut plates held therein to be used even though the assembly channel is in contact with a stringer. The instant invention enlarges the fastener hole in the channel as well as slots on both sides of the channel and cuts a connecting slot between the hole and the slot sufficient to permit passage of a fastening screw or bolt. In this way the gang channel nut assembly still functions as originally intended that is, to positively retain the nut plates and align them in the channel, but permit the nut plates to be flexible or float transverse of the channel without falling out of the channel.

10 Claims, 2 Drawing Sheets

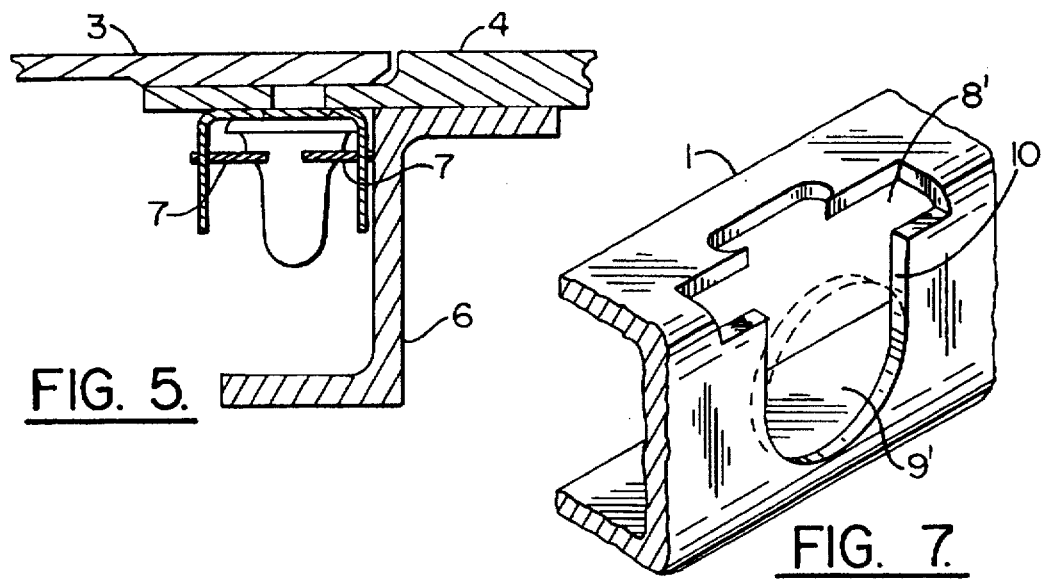
FIG. 5.
FIG. 7.
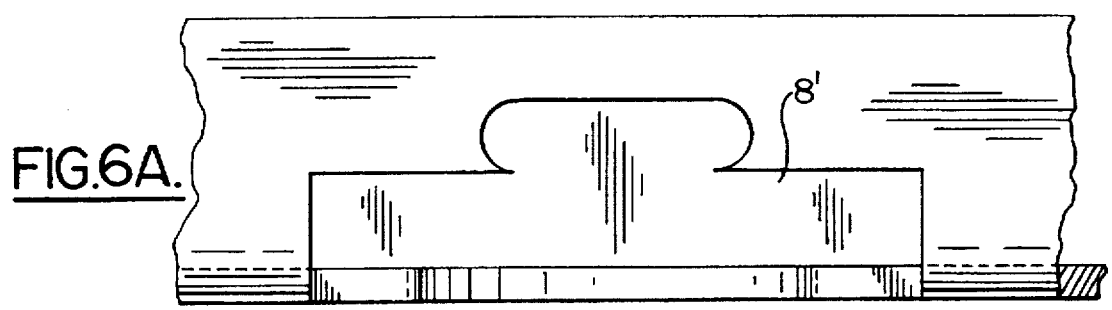
FIG. 6A.
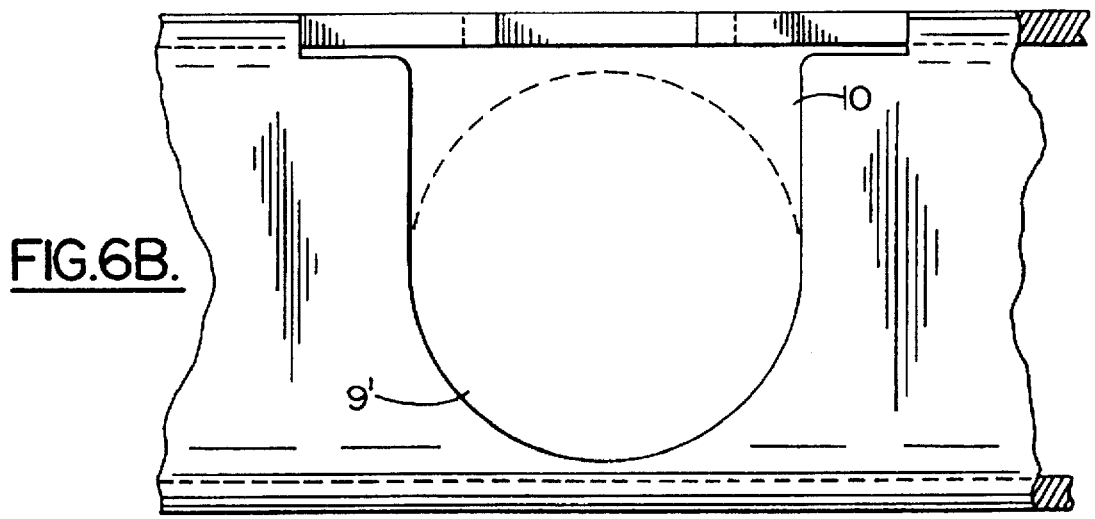
FIG. 6B.

FLOATING GANG CHANNEL/NUT ASSEMBLY

BACKGROUND OF THE INVENTION

1. Field of the Invention

The field of this invention relates to apparatus for fastening together various assembly panels used in aircraft and other construction. More specifically, this invention relates to the use of gang channel/nut assemblies which are held in place in a channel and permit slidable adjustment or flexible adjustments for receiving screws or bolts through misaligned holes in such structural members.

2. Description of Related Art

There have been numerous prior related art devices which include some means for allowing connection of nuts and bolts through misaligned structures. Several of these include gang channels which support nuts and permit the nuts to slide longitudinally of the channel or tilt or otherwise move in order to receive fastening hardware such as screws, bolts and the like. These are typified by U.S. Pat. No. 5,324,146 to Perenti, U.S. Pat. No. 4,695,212 to BERECZ, U.S. Pat. No. 4,768,907 to Gauron, and U.S. Pat. No. 4,895,484 to WILCOX. While such devices do permit the attachment of fasteners to misaligned panels, they are limited in that the channel sides where channels are used interfere with the ability of the fastener to contact the nut within the channel. In aircraft wing skin and stringers that are mislocated relative to each other, channel fastening device is held in channel nut assemblies would not allow access doors and other fastening elements to be installed. As is often the case, access doors and gang channel assemblies as well as other parts are constructed to be interchangeable which means that any change or repair cannot affect the changeability of such parts when used in other structures where alignment is not as critical or misalignment has not occurred. In addition, any repair must prevent any fuel leaks and maintain a positive retention for all parts.

BRIEF DESCRIPTION OF THE INVENTION

The instant invention does not require major repair to primary structures such as wing skin and stringers or other doors or other parts but allows gang channels and other assemblies to be used by making the nuts contained therein to be flexible and receive fasteners even if there is a misalignment in wing skin stringer assembly or other structural parts. This invention permits nut plates held within the gang channel nut assembly to be used even though the assembly channel was in contact with the stringer. Stringers could not be trimmed, that is a primary structure, to allow the entire gang channel nut plate to move transversely to the nut plates. Stringers are very critical to the wing strength and durability and in fact, lower stringers are fracture critical parts and trimming or other structural changes is inadvisable. Instead, the instant invention takes the old style gang channel nut assembly and enlarges the existing hole as well as the existing slot on both sides of the channel and cuts an additional slot between the hole and the channel sufficient to permit passage of the fastening screw or bolt. In this way the channel still functions as originally intended that is, to positively retain the nut plates and align them in the channel, but permit the nut plates to be flexible or float transverse of the channel without falling out of the channel. In the event the holes in the skin are not perfectly aligned and the fastener must be inserted at an angle, the nut plate will always line up to receive the fastener and thereby aligns various plates and structural members. In the event holes are positioned too close to the stringer or other structure member the nut plate may be positioned transverse of the channel to receive fasteners. The floating gang channel nut assembly can be used in all aircraft both commercial and military and for any other function where misaligned structures must be joined without regard to stringer position or channel abutment of other structures. This invention results in no major repair on primary structures, interchangability is not affected, no major redesign of either the structures or gang channel nut assemblies is required, existing parts can be reworked and in fact manufacturing cost is reduced in that hole tolerances need not be as precise as originally designed due to the ability of the channel nut assembly to accommodate significant misalignment.

BRIEF DESCRIPTION OF DRAWINGS

FIG. 5 is a side cross section view of the new channel with a nut aligned with the hole and protruding through the side of the channel FIG. 6A and 6B is a perspective view of an alternative structure. "FIG. 7 is a perspective view of another embodiment of the channel structure of the present invention."

PREFERRED EMBODIMENT(S) OF THE INVENTION

Figure 1:
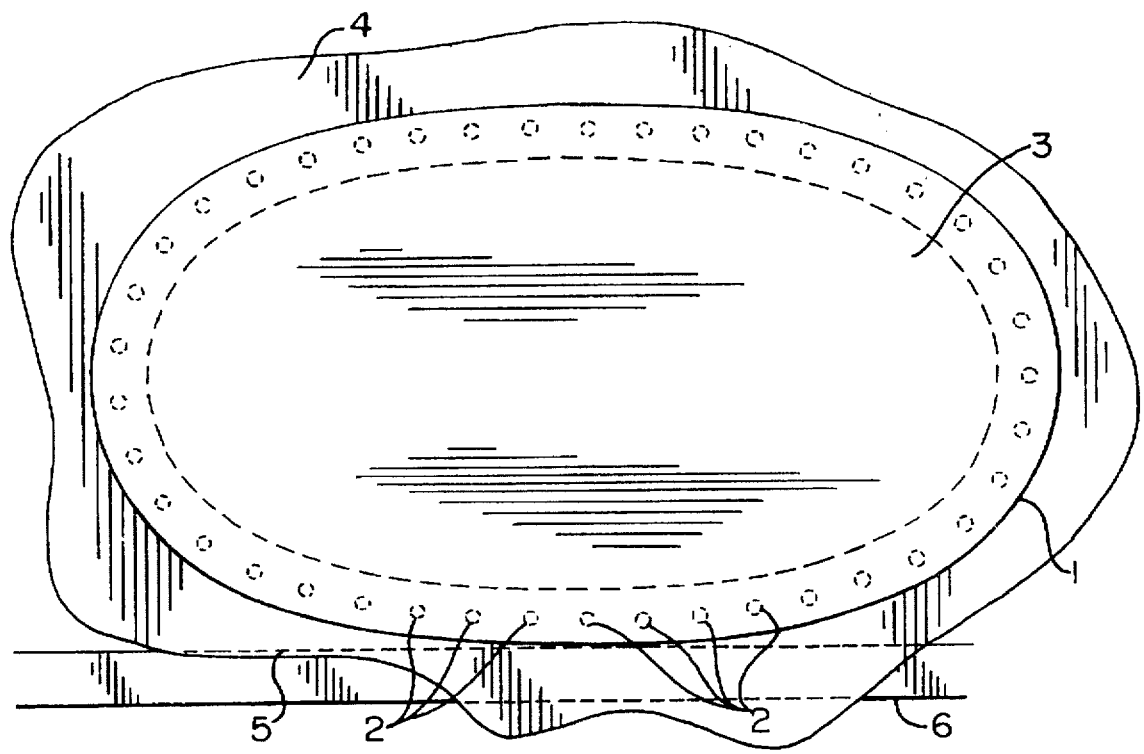
FIG. 1 is a planer view of the channel nut assembly in a skin attachment position.
Figure 2:
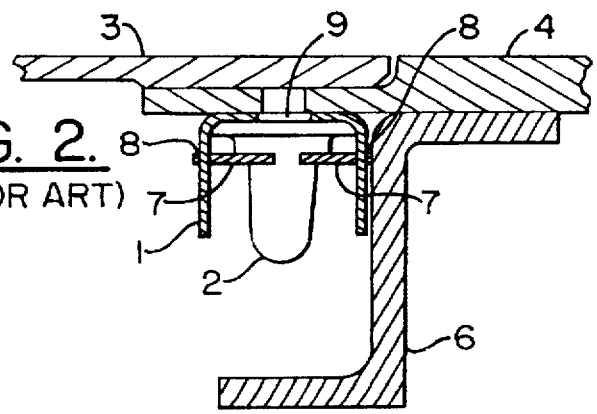
FIG. 2 is a perspective view of a portion of the standard channel.
Figure 3:
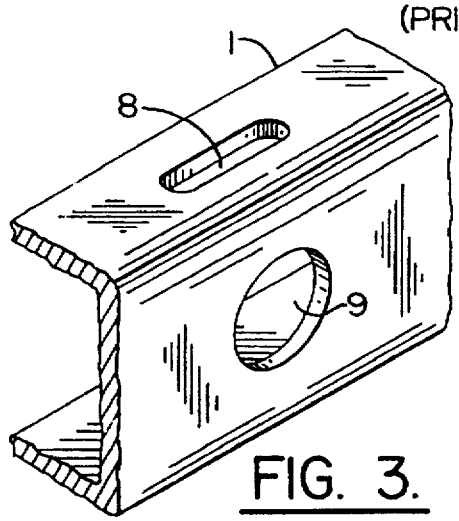
FIG. 3 is a side cross section view of the standard channel against a stringer with a nut in place with misaligned holes.

The instant invention avoids major repair to primary structures such as wing skin and stringers or other doors or other parts when misalignment occurs and allows gang channels and other assemblies to be used by making the nuts contained therein to be adjustable and receive fasteners even if there is a misalignment in wing skin stringer assembly or other structural parts. With reference to the drawings, FIG. 1 shows a series of nut plates 2 in a channel 1, positioned around a structure 3 which is to be attached to an additional structure 4. The dotted straight line 5 represents the position of a stringer 6. As can be seen, the nut plates 2 closest to the stringer 6 may be positioned close to stringer only to the degree they are not already against the edge of the channel 1. As shown in FIG. 2 and 3 the existing channel nut plate 2 is held in place in the channel 1 by retaining clips 7 which engage slots 8 on either side of the channel 1. The nut plate 2 is positioned over a hole 9 in the channel 1 slightly larger than the fastener, not shown received by the nut plate 2. If misalignment occurs in the longitudinal direction along the channel 1, this can be accommodated by limited motion in the slot 8.

Figure 4:
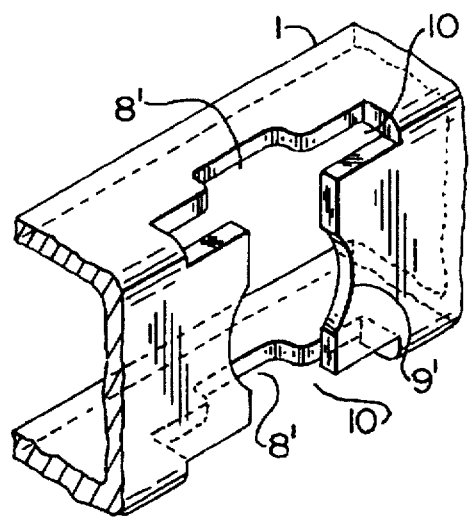
FIG. 4 is a perspective view of the new channel structure.

However, as indicated in FIG. 3, if misalignment occurs transverse of the longitudinal axis of the channel 1, the nut plate 2 cannot adjust in the transverse direction due to impact with the sides of the channel 1. If structural elements such as the stringer 6 are immediately adjacent the width of channel 1 sides and the retaining clip 7 edge also prevent transverse movement. Stringers 6 should not be trimmed to allow the entire gang channel nut plate to move transversely to accommodate the misalignment because they are primary structures. Stringers 6 are very critical to wing strength and durability and in fact, lower stringers 6 are fracture critical parts and trimming or other structural changes is inadvisable. This invention permits nut plates 2 held within the gang channel nut assembly to be used even though the assembly channel 1 is in contact with the stringer 6. The instant invention modifies the old style gang channel nut assembly and enlarges the existing hole 9 to a hole 9' and enlarges the existing slot 8 on both sides of the channel to an oversize slot 8' which overlaps the side and bottom of the channel 1 and permits the edge of the channel nut plate 2 to protrude. An additional slot 10 is cut between the hole 9' and the slot 8' sufficient to permit clearance of a fastening screw or bolt. In this way the channel 1 nut and retaining clips 7 still functions as originally intended that is, to positively retain the nut plates and align them in the channel 1, but also permits the nut plates 2 to be flexible or float transverse of the channel 1 without falling out of the channel 1. In the event the attachment holes in the skin 3 and 4 are not perfectly aligned and the fastener must be inserted at an angle or to close to the stringer 6, the nut plate 2 will always line up to receive the fastener and thereby permit the attachment of various plates and structural members even if misaligned. The floating gang channel nut assembly can be used in all aircraft both commercial and military and for any other function where misaligned structures must be joined without regard to stringer position or channel abutment of other structures. This invention results in no major repair on primary structures, interchangability is not affected, no major redesign of either the structures or gang channel nut assemblies is required, existing parts can be reworked and in fact manufacturing cost is reduced in that hole tolerances need not be as precise as originally designed due to the ability of the channel nut assembly to accommodate significant misalignment. While FIG. 4 shows a hole which interconnects slots 8' on both sides of the channel 1 an alternative embodiment as shown in FIGS. 6A, 6B and 7.

FIG. 6A shows the enlarged slot 8' and FIG. 6B hole 9' as before, however, the width of intersecting slot 10 is of the same diameter as hole 9'. In addition, only one slot 8' provided as shown in FIG. 7 to permit the nut plate to slide transverse of the channel 1 on only one side while the first alternative permits such adjustment on both sides of the channel 1.

Having thus described the invention what is claimed is:

1. A floating gang channel nut assembly comprising:
    a channel having at least one hole therein; and
    at least one fastening device received by said channel movable transverse of the longitudinal axis of said channel and adapted for receiving a mating fastener through said hole, wherein the hole in said channel further comprises a central section in the bottom of said channel through which the fastener can extend, at least one slotted section along one side of said channel through which an edge portion of said fastening device can extend, and a connecting slot communicating between said central section and said slotted section through which at least a portion of the fastener can extend if the fastener is misaligned with said central section of said hole.

2. An assembly as described in claim 1 wherein said channel has a plurality of holes and a plurality of fastening devices received by said channel each movable transverse of the longitudinal axis of said channel and adapted for receiving a plurality of mating fasteners through a plurality of holes.

3. An assembly as described in claim 1 wherein said hole in said channel further comprises a second slotted section along the opposite side of said channel through which an edge portion of said fastening device can extend, and a connecting slot communicating between said central section and said second slotted section through which at least a portion of the fastener can extend if the fastener is misaligned with said central section of said hole.

4. An assembly as described in claim 3 wherein said channel has a plurality of holes and a plurality of fastening devices received by said channel each movable transverse of the longitudinal axis of said channel and adapted for receiving a plurality of mating fasteners through a plurality of holes.

5. A floating gang channel nut assembly comprising:
    a channel having plurality of holes therein; and
    a plurality of fastening devices received by said channel movable transverse of the longitudinal axis of said channel and adapted for receiving a plurality of mating fasteners through said holes, wherein each of said plurality of holes in said channel further comprises a central section in the bottom of said channel through which the fastener can extend, at least one slotted section along one side of said channel through which an edge portion of said fastening device can extend and a connecting slot communicating between said central section and said slotted section through which at least a portion of the fastener can extend if the fastener is misaligned with said central section of said hole.

6. An assembly as described in claim 5 wherein said hole in said channel further comprises a second slotted section along the opposite side of said channel through which an edge portion of said fastening device can extend, and a connecting slot communicating between said central section and said second slotted section through which at least a portion of the fastener can extend if the fastener is misaligned with said central section of said hole.

7. A floating gang channel nut assembly comprising:
    a. a channel having a bottom and opposed sides, said channel defining a plurality of shaped holes formed in the bottom and at least one side of said channel, and
    b. a plurality of fastening devices received by said channel movable transverse of the longitudinal axis of said channel and adapted for receiving a plurality of mating fasteners through said holes such that at least one edge of said fastening devices protrudes through the side of said channel through said hole where necessary to receive said mating fasteners.

8. An assembly as described in claim 7 wherein a plurality of holes in said channel further comprises a central section in the bottom of said channel larger than cross section of the mating fasteners, at least one slotted section along one side of said channel for each of a plurality of such holes and a connecting slot communicating between said central section and said slotted section for each of a plurality of such holes for selectively permitting a portion of said fastening device to enter said slotted section at the side of said channel.

9. An assembly as described in claim 8 wherein said hole in said channel further comprises a second slotted section along the opposite side of said channel and a connecting slot communicating between said central section and said second slotted section for selectively permitting a portion of said fastening device to enter said second slotted section at the side of said channel.

10. An assembly as described in claim 9 wherein a plurality of said fastening device are threaded channel nuts.

* * * * *